(12) United States Patent
Dry et al.

(10) Patent No.: US 10,576,848 B2
(45) Date of Patent: Mar. 3, 2020

(54) STORAGE ENCLOSURE WITH MOVABLE MEMBER

(71) Applicant: Ford Global Technologies, LLC, Dearborn, MI (US)

(72) Inventors: Alan George Dry, Grosse Pointe Woods, MI (US); Marcos Silva Kondrad, Macomb Township, MI (US); Kevin Wayne Preuss, Berkley, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 15/664,320

(22) Filed: Jul. 31, 2017

(65) Prior Publication Data

US 2019/0031108 A1    Jan. 31, 2019

(51) Int. Cl.
*B60N 2/20* (2006.01)
*B60R 5/04* (2006.01)

(52) U.S. Cl.
CPC .............. *B60N 2/206* (2013.01); *B60R 5/045* (2013.01)

(58) Field of Classification Search
CPC .... B60N 2/206; B60N 2/3015; B60N 2/3093; B60N 2/34; B60N 2/3013; B60N 2205/35; B60P 1/64; B60P 1/6409; B60P 1/6427; B60P 1/649; B60R 5/04; B60R 5/045; B60R 7/04; B60R 2011/0036; B60R 2011/0015
USPC .......................... 296/37.16, 69, 24.43, 24.33
See application file for complete search history.

(56) References Cited

U.S. PATENT DOCUMENTS

| | | | | |
|---|---|---|---|---|
| 3,132,781 A | * | 5/1964 | Poczatek | B60R 5/04 217/5 |
| 4,270,790 A | | 6/1981 | Curotto | |
| 5,083,827 A | * | 1/1992 | Hollenbaugh, Sr. | B60R 13/01 220/4.08 |
| 5,381,940 A | * | 1/1995 | Wright | B60R 7/02 220/533 |
| 5,634,408 A | | 6/1997 | Jarkowski | |
| 5,692,792 A | * | 12/1997 | Klar (minor) | B60J 5/101 296/26.02 |
| 5,967,584 A | * | 10/1999 | McCarthy | B60N 2/3022 296/37.16 |
| 6,039,378 A | * | 3/2000 | Bailey | B60R 5/045 296/37.16 |
| 6,113,172 A | * | 9/2000 | Chaloult | B60N 2/3011 224/496 |

(Continued)

FOREIGN PATENT DOCUMENTS

| | | |
|---|---|---|
| DE | 19619126 A1 | 11/1997 |
| FR | 2693156 A1 | 1/1994 |
| FR | 2936196 A1 | 3/2010 |

*Primary Examiner* — Glenn F Myers
(74) *Attorney, Agent, or Firm* — Vichit Chea; Price Heneveld LLP

(57) ABSTRACT

A storage enclosure for a vehicle includes a seatback, an outboard member, a ceiling, and a tray. The tray includes a base with at least one wall extending upward from the base. The tray is selectively operable to transfer cargo between a passenger area and a cargo area. The tray is selectively operable to define the storage enclosure in the cargo area that is at least partially defined by the seatback, the outboard member, and the ceiling. The seatback is in a substantially vertical position.

18 Claims, 14 Drawing Sheets

(56) References Cited

U.S. PATENT DOCUMENTS

| | | | | |
|---|---|---|---|---|
| 6,290,277 | B1* | 9/2001 | Spykerman | B60R 5/04 |
| | | | | 224/496 |
| 6,422,567 | B1* | 7/2002 | Mastrangelo | B60R 5/04 |
| | | | | 224/281 |
| 8,894,031 | B2* | 11/2014 | Sailer | B60N 2/01 |
| | | | | 248/352 |
| 2003/0222475 | A1* | 12/2003 | Nakamitsu | B60R 5/045 |
| | | | | 296/37.16 |
| 2004/0145206 | A1* | 7/2004 | Hicks | B60R 7/02 |
| | | | | 296/37.16 |
| 2008/0150310 | A1* | 6/2008 | Leroy | B60R 5/044 |
| | | | | 296/37.16 |
| 2012/0313394 | A1* | 12/2012 | Barrow | B60N 2/3011 |
| | | | | 296/64 |
| 2013/0193708 | A1* | 8/2013 | Lucas | B60R 7/043 |
| | | | | 296/37.16 |

* cited by examiner

US 10,576,848 B2

STORAGE ENCLOSURE WITH MOVABLE MEMBER

FIELD OF THE DISCLOSURE

The present disclosure generally relates to storage enclosures and more specifically to storage enclosures with movable members in vehicles.

BACKGROUND OF THE DISCLOSURE

Convenient access to vehicle cargo has become increasingly important as passengers seek user friendly cargo stowage options. Secure and convenient transfer of cargo within a vehicle is paramount for satisfying customer needs. Improved cargo storage and transfer options are always desired.

SUMMARY OF THE DISCLOSURE

According to one aspect of the present disclosure, a storage enclosure for a vehicle includes a seatback, an outboard member, a ceiling, and a tray. The tray includes a base with at least one wall extending upward from the base. The tray is selectively operable to transfer cargo between a passenger area and a cargo area. The tray is selectively operable to define the storage enclosure in the cargo area that is at least partially defined by the seatback, the outboard member, and the ceiling when the seatback is in a substantially vertical position.

Embodiments of the first aspect of the disclosure can include any one or a combination of the following features:
  the outboard member is a vehicle wall;
  the outboard member is a panel coupled to the vehicle;
  the panel is coupled to a cargo area floor, the ceiling, or a back wall of the vehicle;
  the at least one wall of the tray includes a sidewall and a back wall;
  the ceiling defines a multilayer construction;
  the tray is movable in a longitudinal direction from the passenger area to the cargo area;
  the tray is movable in a latitudinal direction within the cargo area;
  a cargo area floor and a back of the seatback;
  the cargo area floor and the back of the seatback form a cargo loading surface when the seatback is in a substantially horizontal position;
  one or more rails;
  the one or more rails are coupled to the cargo loading surface; and/or
  the tray is coupled to the one or more rails and slides along the one or more rails from the passenger area to the cargo area when the seatback is in a substantially horizontal position.

According to another aspect of the present disclosure, a tray includes a bottom portion and first and second walls. The bottom portion is arranged proximate a seatback and an outboard member to form a storage enclosure with the first and second walls. The bottom portion is selectively positionable within a vehicle between a loading area and a cargo area when the seatback is positioned horizontally.

Embodiments of the second aspect of the disclosure can include any one or a combination of the following features:
  the bottom portion is retained in the cargo area when the seatback is vertical;
  the bottom portion includes rollers;
  the outboard member is a panel; and/or
  the panel and the bottom portion are selectively coupled when the panel is within a groove defined in the bottom portion.

According to another aspect of the present disclosure, a cargo handling system for a vehicle includes a passenger area, a cargo area, and at least one tray selectively movable between the passenger area and the cargo area.

Embodiments of the third aspect of the disclosure can include any one or a combination of the following features:
  the passenger area comprises a primary loading area proximate a front door;
  the passenger area further comprises a secondary loading area proximate a rear door;
  the at least one tray is selectively movable among the primary loading area, the secondary loading area, and the cargo area;
  the at least one tray includes a plurality of trays; and/or
  the at least one tray includes a plurality of trays and wherein the plurality of trays are selectively movable among the primary loading area, the secondary loading area, and the cargo area.

These and other aspects, objects, and features of the present disclosure will be understood and appreciated by those skilled in the art upon studying the following specification, claims, and appended drawings.

DETAILED DESCRIPTION

Figure 1:
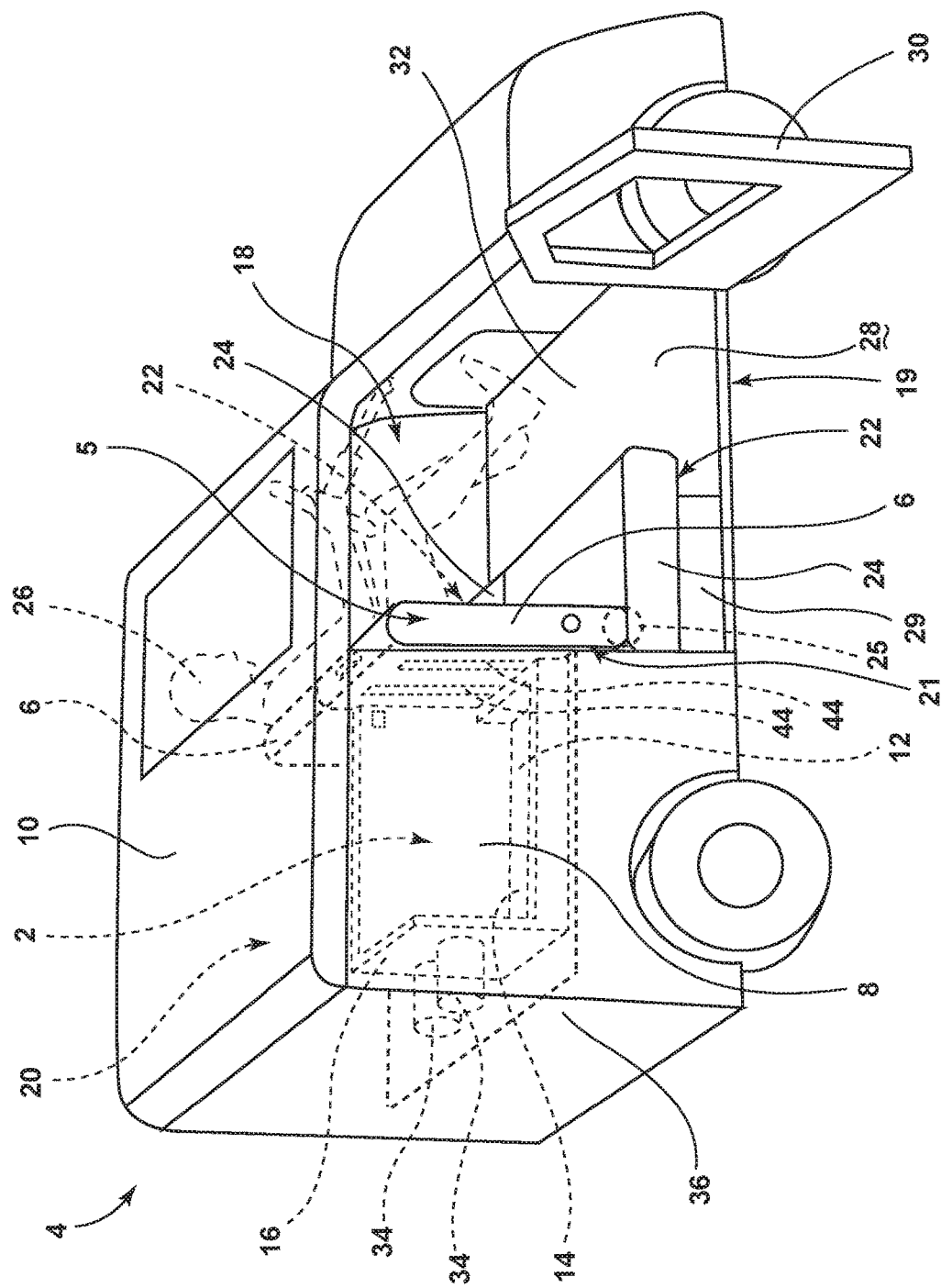
FIG. 1 is a perspective view of a vehicle with the storage enclosure of an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

With reference to FIGS. 1-15, a storage enclosure 2 for a vehicle 4 is defined by a seatback 6, a ceiling 10, a tray 12, and an outboard member that may include outboard vehicle body panel 8, first panel 140, second panel 142, third panel 144, and various other members, including the member generally depicted by outboard member 145. The tray 12 includes a base 14 with at least one wall 16 extending upward from the base 14. The tray 12 is selectively operable to transfer cargo between a passenger area 18 and a cargo area 20. The tray 12 is selectively operable to define the storage enclosure 2 in the cargo area 20 that is at least partially defined by the seatback 6, the ceiling 10, an outboard member that may include outboard vehicle body panel 8, first panel 140, second panel 142, third panel 144, and various other members including the member generally depicted by outboard member 145. The seatback 6 is in a substantially vertical position 5.

In certain situations, when it is desirable to use a single vehicle entry point to load luggage and enter the vehicle 4, it is desirable to use the tray 12 to transfer luggage to a storage enclosure 2 partially defined by the tray 12. By way of example, a passenger approaches a vehicle 4 that is waiting for a passenger at an airport curb. The passenger opens the passenger door 30, moves the seatback 6 from the substantially vertical position 5 to the substantially horizontal position 7 by rotating the seatback 6 about pivot 25, slides the tray 12 from the cargo area 20 to the loading area 32, places luggage into the tray 12, moves the tray 12 from the loading area 32 to the cargo area 20, and loads luggage into the tray 12. The passenger then slides the tray 12 back to the cargo area 20, rotates the seatback 6 from the substantially horizontal position 7 to the substantially vertical position 5 about a pivot 25, enters the passenger area 18, and sits on a seating assembly 22. The tray 12 together with the seatback 6, the outboard vehicle body panel 8, and the ceiling 10 define a storage enclosure 2 for the luggage. The storage enclosure 2 contains luggage during erratic driving or collisions. When the vehicle 4 has reached its destination, the passenger leaves the vehicle 4, and the passenger rotates the seatback 6 about the pivot 25 from the substantially vertical position 5 to the substantially horizontal position 7. The tray 12 is transferred from the cargo area 20 to the loading area 32 so that a passenger may conveniently unload the luggage from the tray 12 at the vehicle entry point 19. Accordingly, providing a storage enclosure 2 with a tray 12 that moves between the loading area 32 near the vehicle entry point 19 and the cargo area 20, as generally shown in FIGS. 1-15, provides a more pleasant traveling experience for the occupant.

Referring to FIGS. 1-15, a cargo handling system 21 includes at least a passenger area 18, a cargo area 20, and at least one tray 12 that is selectively movable between the passenger area 18 and the cargo area 20. In various aspects, the passenger area 18 includes a loading area 32.

Referring to FIGS. 1-5, a vehicle 4 includes a passenger area 18 and a cargo area 20. The passenger area 18 contains a seating assembly 22 that includes a seat 24 and a seatback 6. The seatback 6 is selectively rotatable about a pivot 25 so that the seatback 6 can be arranged in at least a substantially vertical position 5 and a substantially horizontal position 7. The driver 26 is in the passenger area 18.

Referring to the aspects generally shown in FIGS. 1-15, the seating assembly 22 is generally configured to seat one person. In various aspects, the seating assembly 22 may provide space for more than one person. In various aspects, the seating assembly 22 may be a bench seat. In the depicted aspect, a pedestal 29 couples the seating assembly 22 to the vehicle floor 28. In various aspects, the seating assembly 22 may be coupled to the floor, side, or other structure of the vehicle with rails, rivets, screws, or other attachments.

A passenger door 30 provides access to the passenger area 18 and the loading area 32. In the depicted aspect, dampers 34 protrude from the vehicle back wall 36. In various aspects, dampers 34 may protrude from the tray 12.

Figure 2:
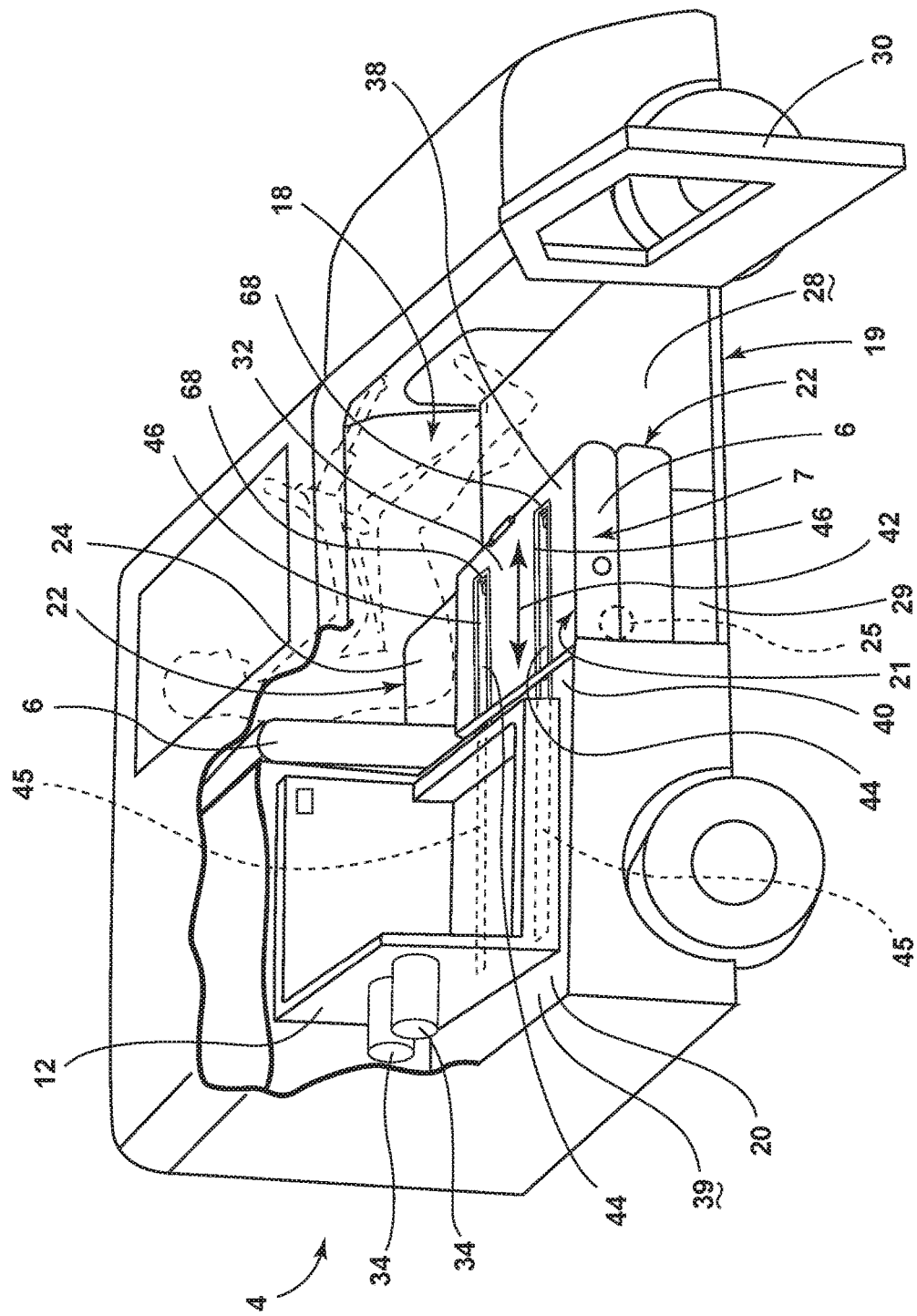
FIG. 2 is a cutaway perspective view of the vehicle of FIG. 1 with the tray in the vehicle cargo area of an aspect of the present disclosure.

Referring to FIG. 2, a cargo area floor 39 and a back 38 of the seatback 6 form a loading surface 40. The vehicle door 30 is open, and the seatback 6 is in a substantially horizontal position 7. An arrow 42 indicates the longitudinal directions in which the tray 12 typically moves along the loading surface 40 between the loading area 32 and the cargo area 20. In various aspects, tray 12 may travel along rails 44. In various aspects, mechanical features 45 such as bearings, rollers, protrusions, or a combination thereof may be located along the bottom of tray 12 and may engage with rails 44 to move the tray 12 along rails 44. In various aspects, rails 44 may be equipped with inertia locks 46 that may fix the tray 12 in a stationary position during vehicle impact. In various aspects, inertia locks 46 activate to substantially immobilize the tray 12 when an accelerometer or other device detects an acceleration or other event above a predetermined threshold value.

Figure 3:
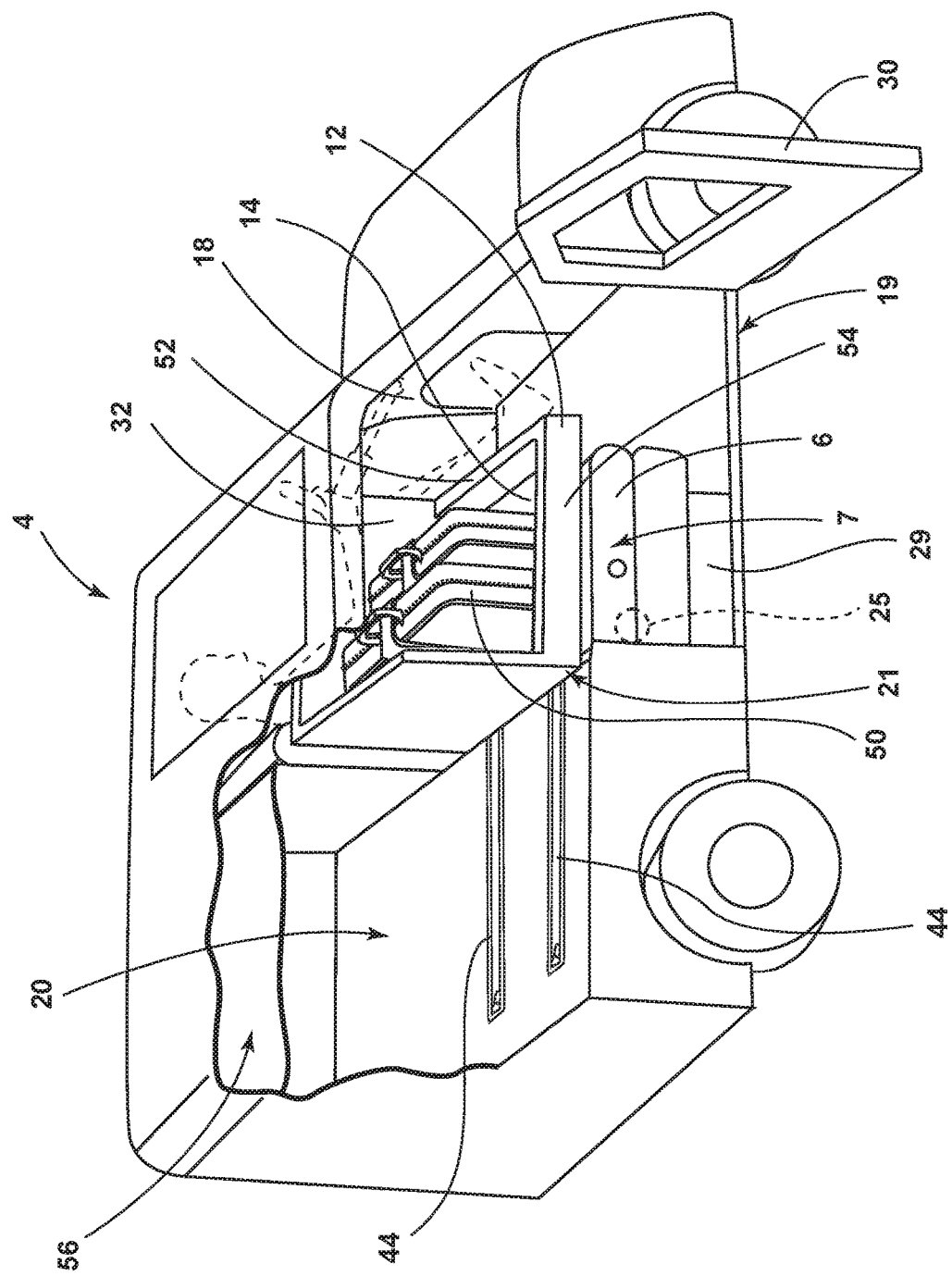
FIG. 3 is a cutaway perspective view of the vehicle of FIG. 2 with the tray with luggage in the vehicle loading area of an aspect of the present disclosure.

FIG. 3 depicts the tray 12 in the loading area 32. Luggage 50 is in the tray 12. The tray 12 includes a first lip 52 on the front side of the tray 12 and a second lip 54 on the outboard side of the tray 12. The first lip 52 and the second lip 54 typically provide a clear indication of a perimeter of the tray 12 base 14. In the depicted aspect, vehicle 4 has a multilayer ceiling 56.

Figure 4:
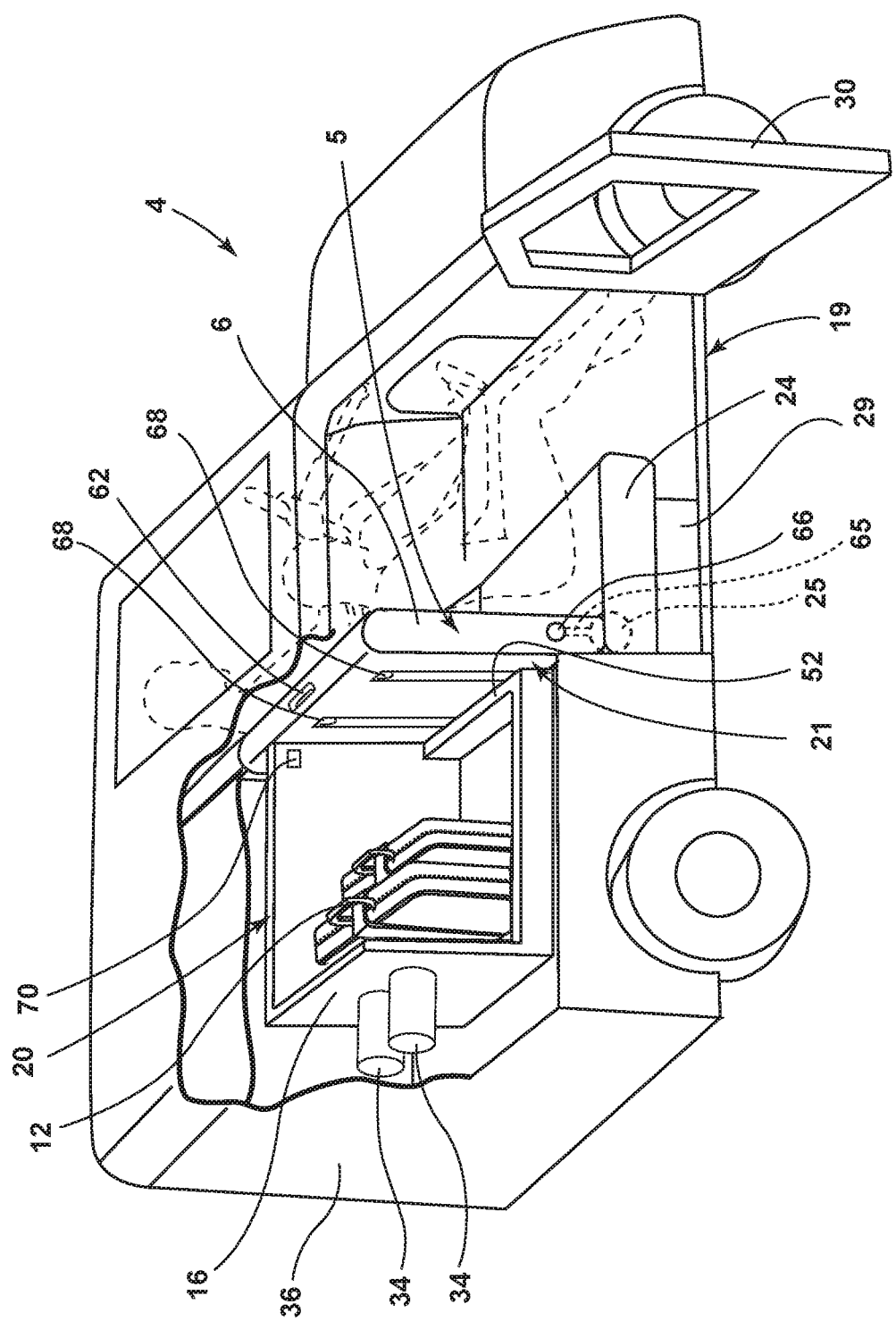
FIG. 4 is a cutaway perspective view of the vehicle of FIG. 3 with the storage enclosure with luggage of an aspect of the present disclosure.

Referring to FIG. 4, the tray 12 is in the cargo area 20. The seatback 6 is in the substantially vertical position 5. The tray 12 sits tightly against the dampers 34 that protrude from back panel 36 of vehicle 4 and act against the wall 16 of the tray 12. A grip 62 is on top of the seatback 6 to rotate the seatback 6 between at least the substantially horizontal position 7 and the substantially vertical position 5 about the pivot 25. As the seatback 6 is moved from the substantially horizontal position 7 to the substantially vertical position 5, the seatback 6 may function as a lever to press the tray 12 into the cargo area 20 and to compress the dampers 34 to eliminate positional looseness between the wall 16 of the tray 12 and the vehicle back wall 36. The first lip 52 of the tray 12 is positioned against the seatback 6.

Referring again to FIGS. 3 and 4, at a vehicle destination, the passenger steps out of the vehicle 4 and turns to face the vehicle 4. The passenger may release a seatback lock 65 so that the seatback 6 rotates about the pivot 25 from the substantially vertical position 5 towards the substantially horizontal position 7 due to the release of compressed force within the dampers 34 that propels the tray 12 towards the seatback 6. In various aspects, a passenger may release the seatback lock 65 by depressing an actuator 66. In various aspects, depressing the actuator 66 may trigger a release of an engagement between the seat 24 and the seatback 6 at the pivot 25 or elsewhere to release the seatback 6 from a fixed substantially vertical position 5. In various aspects, the dampers 34 contain compressed springs or other preloaded members that will push the tray 12 forward onto the seatback 6 in the substantially horizontal position 7. In various aspects, the passenger pulls the tray 12 forward until it engages detents 68. In various aspects, when the tray 12 engages detents 68, it is fixed in place. In various aspects, the tray 12 may include backlit translucent surfaces to provide increased visibility proximate the tray 12.

In various aspects of the disclosure, pneumatic, mechanical, or other means may be used within the tray 12 to restrain movement of the luggage 50 or cargo. In various aspects of the disclosure, restraint of the luggage or cargo minimizes NVH (noise vibration harshness) within the vehicle 4. In various aspects of the disclosure, pneumatic, mechanical, or other means may also be used to release the luggage 50 and/or cargo from the tray 12 when the seatback 6 is released from the substantially vertical position 5. In various aspects of the disclosure, the storage enclosure 2 and/or the cargo area 20 may be equipped with a part present sensor 70 which alerts the passenger at the destination if there is anything in the tray 12 without releasing the seatback 6 from the substantially vertical position 5.

Figure 5:
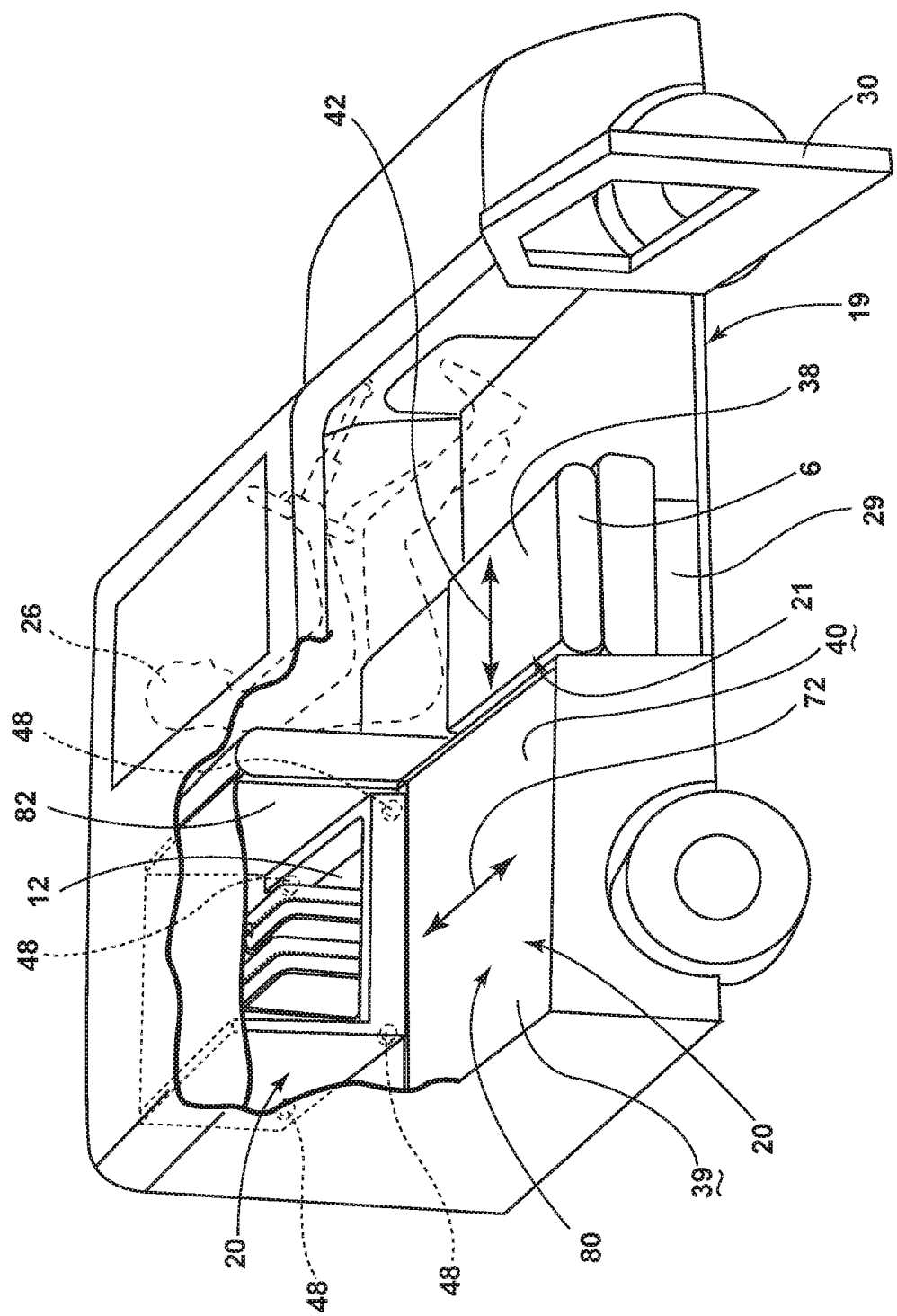
FIG. 5 is a cutaway perspective view of a vehicle with the tray with luggage in the vehicle cargo area of another aspect of the present disclosure.

Referring to FIG. 5, the cargo area 20 includes the passenger side cargo area 80 and the driver side cargo area 82. The tray 12 has moved generally latitudinally as shown by arrow 72 from the passenger side cargo area 80 to the driver side cargo area 82. Arrow 72 depicts the typical directions of latitudinal movement. In various aspects, the cargo area 20 floor 39 and the back 38 of the seatback 6 may include a low friction flooring to facilitate latitudinal movement in the direction of arrow 72 and longitudinal movement in the direction of arrow 42. The cargo area 20 floor 39 and the back 38 of the seatback 6 may be a substantially flat load bearing surface that rollers 48 mounted on the tray 12 can easily travel across. In various aspects, the cargo area 20 floor 39 and the back 38 of the seatback 6 may be a low friction flooring. In various aspects, the cargo area 20 floor 39 and the back 38 of the seatback 6 and the tray 12 are part of a low friction mobility system that may utilize PTFE, Teflon, rollers, ball bearings, or other similar elements individually or in combination.

Figure 6:
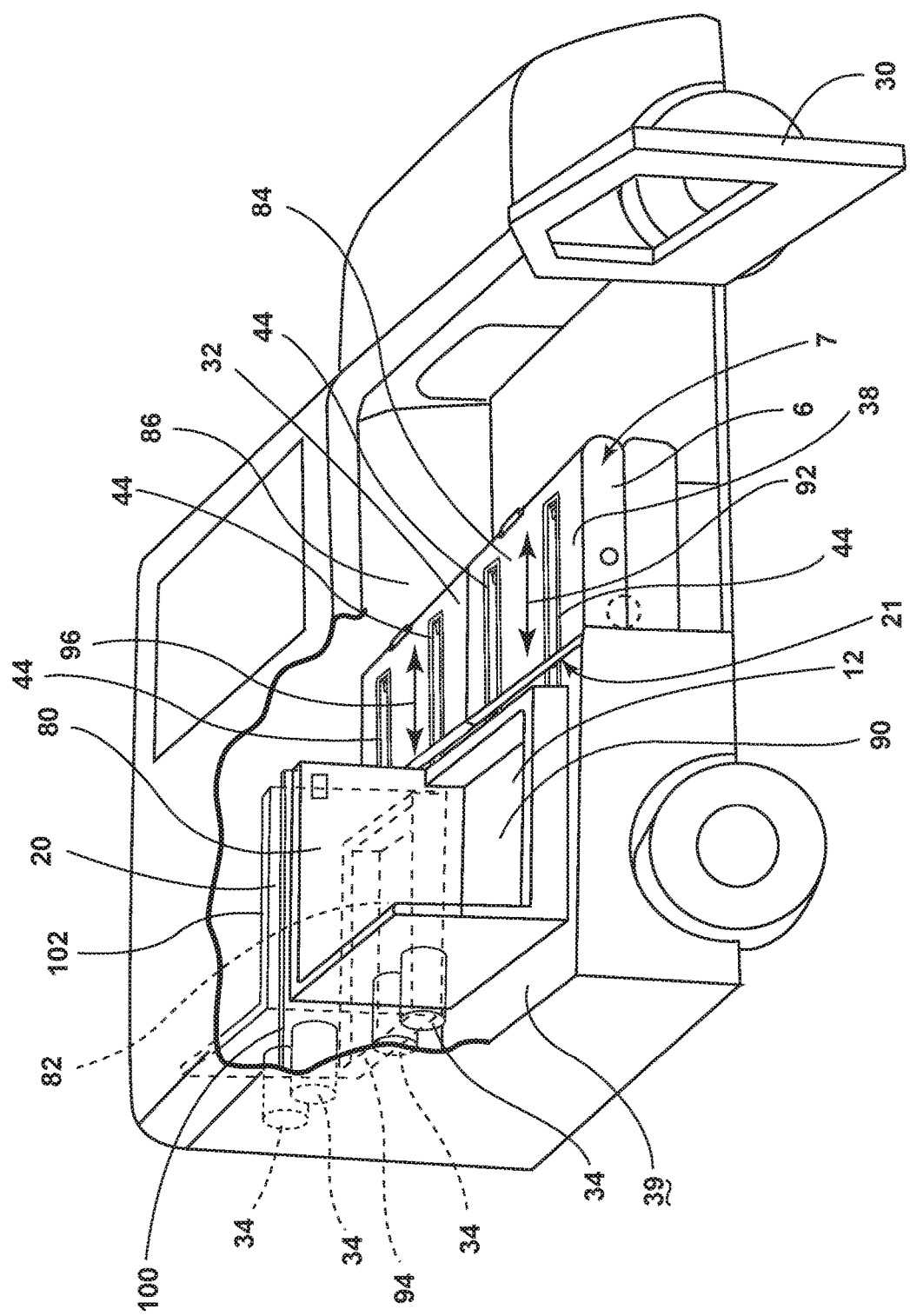
FIG. 6 is a cutaway perspective view of a vehicle with a passenger side tray and a driver side tray in the vehicle cargo area of an aspect of the present disclosure.

Referring to FIG. 6, an aspect of the disclosure is shown with a passenger side tray 90 in the passenger side cargo area 80 and a driver side tray 94 in the driver side cargo area 82. In the depicted aspect, the loading area 32 includes the passenger side loading area 84 and the driver side loading area 86. The passenger side tray 90 slides longitudinally in the directions shown by arrow 92 between the passenger side loading area 84 and the passenger side cargo area 80. The driver side tray 94 slides longitudinally as shown by arrow 96 between the driver side loading area 86 and the driver side cargo area 82. In the depicted aspect, a divider 100 separates the passenger side cargo area 80 and the driver side cargo area 82. In various aspects, the divider 100 may or may not be present in the cargo area 20.

Figure 7:
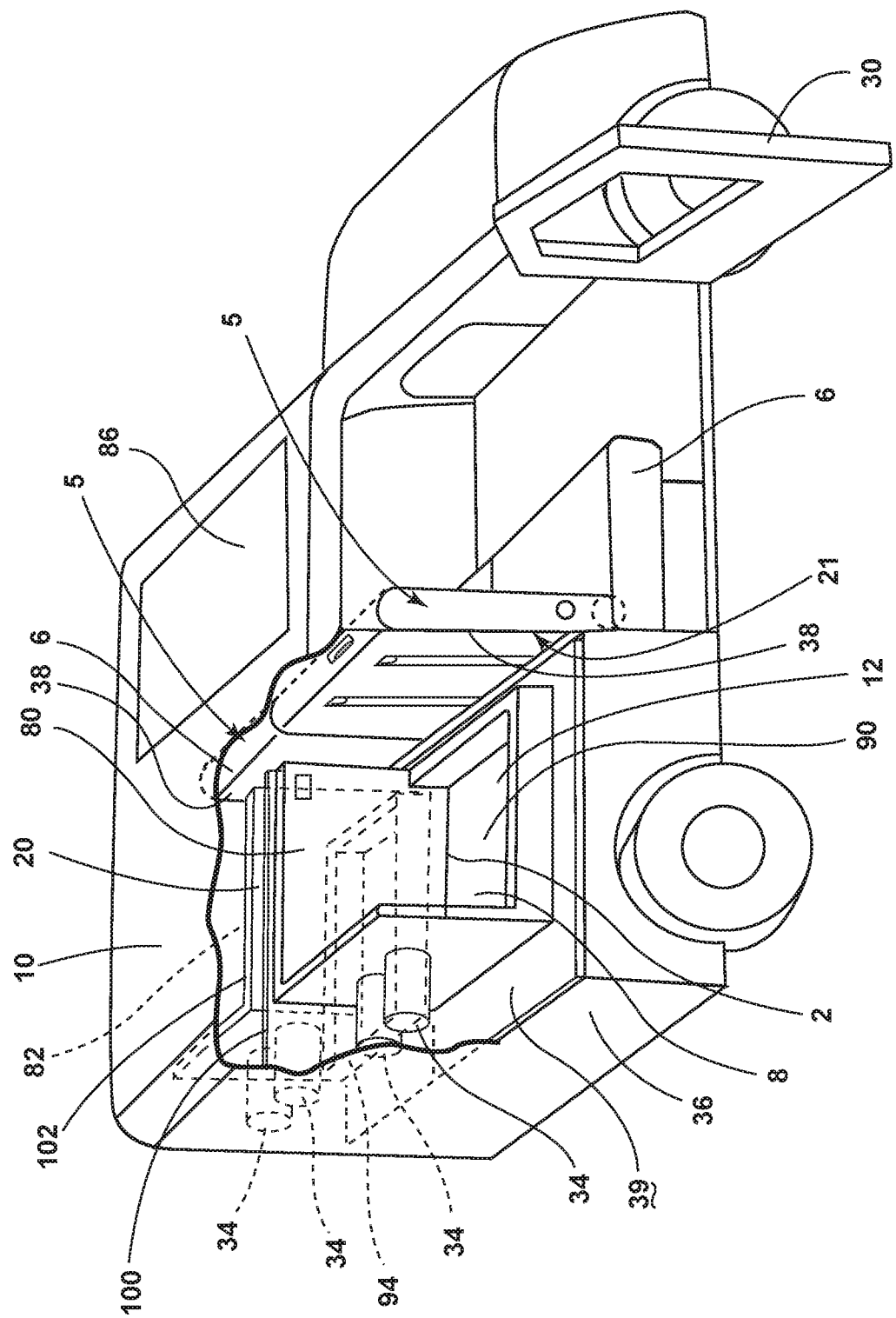
FIG. 7 is a cutaway perspective view of the vehicle of FIG. 6 with a passenger side storage enclosure and a driver side storage enclosure of an aspect of the present disclosure.

Referring to FIG. 7, in various aspects, the back 38 of the passenger seatback 6 in the substantially vertical position 5, the outboard vehicle body panel 8, the ceiling 10, and the passenger tray 90 form a storage enclosure 2 in the passenger side cargo area 80. In various aspects, the back 38 of the seatback 6 in the substantially vertical position 5, the outboard vehicle body panel 8, the ceiling 10, and the driver side tray 94 form a storage enclosure 102 in the driver side cargo area 82.

Figure 8:
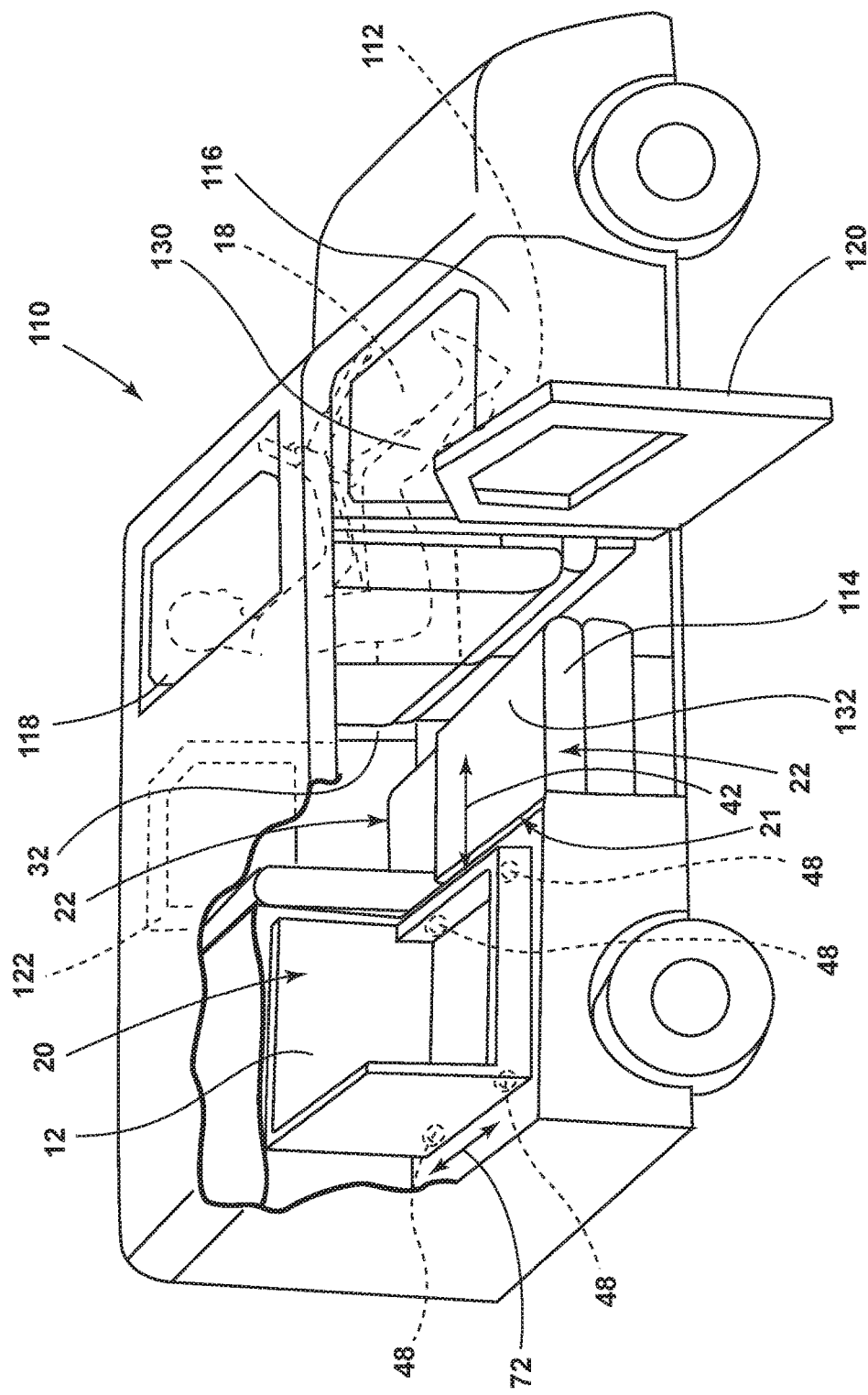
FIG. 8 is a cutaway perspective view of a vehicle with a primary loading area and a secondary loading area with the tray in the cargo area of an aspect of the present disclosure.
Figure 9:
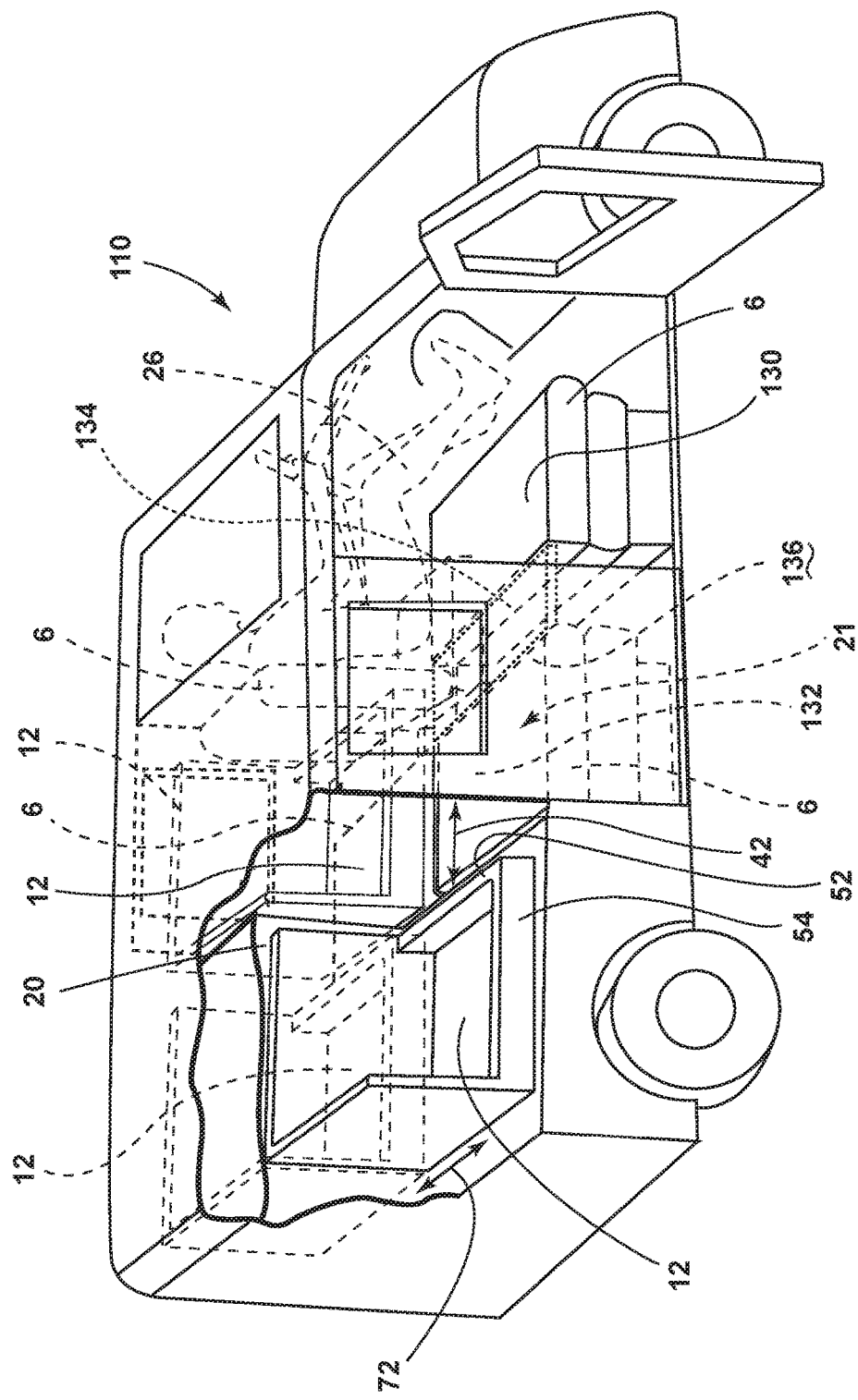
FIG. 9 is a cutaway perspective view of the vehicle of FIG. 8 with the primary loading area and the secondary loading area with three trays of an aspect of the present disclosure.
Figure 10:
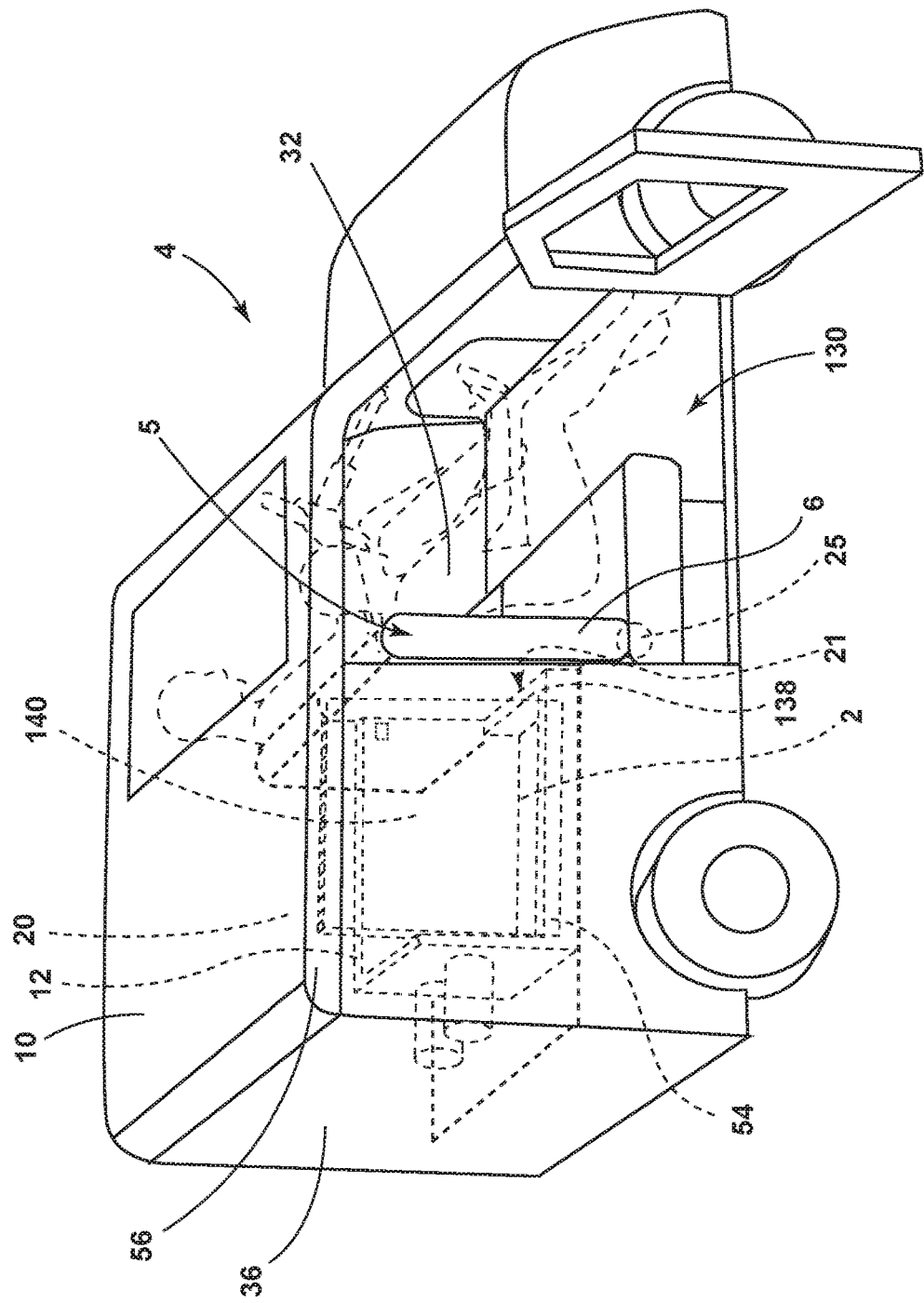
FIG. 10 is a perspective view of a vehicle with the storage enclosure partially defined by an outboard member that is a panel coupled to the vehicle ceiling of another aspect of the present disclosure.

With reference to FIGS. 8 and 9, the cargo handling system 21 may include a passenger area 18. In various aspects, the passenger area 18 may include a loading area 32. In various aspects, the loading area 32 may include a primary loading area 130 and a secondary loading area 132. In the depicted aspects of FIGS. 8 and 9, the primary loading area 130 is proximate the first row of seats 112. In the depicted aspects of FIGS. 8 and 9, the secondary loading area 132 is proximate the second row of seats. In the cargo handling system 21, the tray 12 is selectively movable among the primary loading area 130, the secondary loading area 132, and the cargo area 20. The cargo handling system 21 may include aspects with one or more trays 12. The plurality of trays 12 are selectively movable among the primary loading area 130, the secondary loading area 132, and the cargo area 20. In the depicted aspect, the tray 12 is selectively movable among the primary loading area 130, the secondary loading area 132, and the cargo area 20 in the generally longitudinal directions of arrow 42. In the depicted aspect, the tray 12 is selectively movable among the primary loading area 130, the secondary loading area 132, and the cargo area 20 in the generally latitudinal directions of arrow 72.

In the depicted aspect of FIG. 8, the tray 12 of the vehicle 110 is loaded at the secondary loading area 132. In the depicted aspect, a user moves the tray 12 between the secondary loading area 132 and the cargo area 20 to transfer cargo between the secondary loading area 132 and the cargo area 20. In various aspects, the primary loading area 130 includes all or part of the area between the passenger side front door 116 and the driver side front door 118. In various aspects, the secondary loading area 132 includes all or part of the area between the passenger side rear door 120 and the driver side rear door 122.

With reference to the depicted aspect of FIGS. 8 and 9, the second row of seats 114 includes two seating assemblies 22 that each cover approximately 50% of the second row of seats 114. In various aspects, the second row of seats 114 may include two seating assemblies 22 that cover approximately 40% of the second row of seats 114 and one seating assembly 22 that covers 20% of the second row of seats 114.

With reference to the depicted aspect of FIGS. 8 and 9, the first row of seats 112 includes two seating assemblies 22 that each cover approximately 50% of the first row of seats 112. In various aspects, the first row of seats 112 may include two seating assemblies 22 that cover approximately 40% of the first row of seats 112 and one seating assembly 22 that covers 20% of the first row of seats 112.

Referring to FIG. 9, tray 12 of the vehicle 110 with a first row of seats 112 and a second row of seats 114 is loaded at the primary loading area 130. The tray 12 may be moved from the primary loading area 130, through the secondary loading area 132, and to the cargo area 20. Connecting member 134 may be placed between the seatbacks 6 to provide a cargo loading surface 136.

Referring again to FIG. 9, in the depicted aspect, two or more trays 12 may be stored in the cargo area 20 and may move to the primary loading area 130 and/or the secondary loading area 132 for loading and unloading. In the depicted aspect, the driver seatback 6 of the first row of seats 112 may be lowered to the substantially horizontal position 7 to provide additional space for movement and storage of trays 12 within the vehicle 110.

In various aspects of the disclosure, trays 12 may be rotated in increments of 90° and other amounts to allow tray access areas near first lip 52 and second lip 54 to be accessible from both sides of the vehicle for loading and unloading luggage.

FIGS. 10-15 depict aspects of the disclosure where the outboard member of the storage enclosure 2 is a panel in the cargo area 20. In the depicted aspect of FIG. 10, a first panel 140 is fixedly coupled to the ceiling 10 of the vehicle 4. In various aspects, first panel 140 may be coupled to one or more layers of the multi-layer ceiling 56. The first panel 140 remains in the cargo area 20 when the seatback 6 is rotated about the pivot 25 from the substantially vertical position 5 to the substantially horizontal position 7 and the tray 12 is transferred to the loading area 32. The first panel 140 engages with a groove 138 in the second lip 54 of the tray 12 when the tray 12 is slid into the cargo area 20. In various aspects, when the tray 12 is in the cargo area 20, the storage enclosure 2 defined by the tray 12, the first panel 140, the ceiling 10, and the seatback 6 in the substantially vertical position 5 forms a lining inside the cargo area 20 that prevents loose objects from escaping from the storage enclosure 2 and becoming lost or jammed proximate the tray 12.

Figure 11:
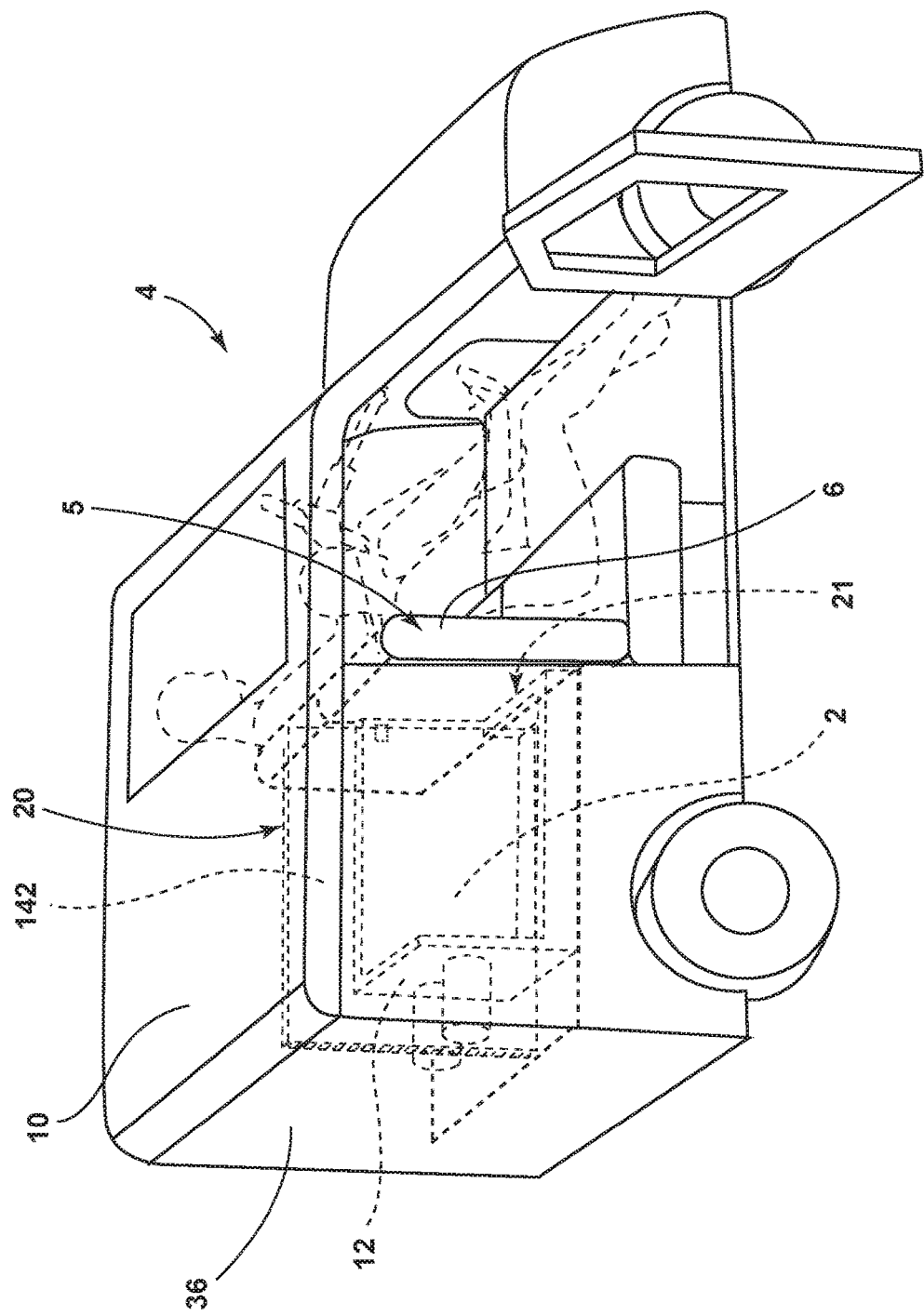
FIG. 11 is a perspective view of a vehicle with the storage enclosure partially defined by an outboard member that is a panel coupled to the vehicle back wall of another aspect of the present disclosure.

Referring to FIG. 11, an aspect of the disclosure where the second panel 142 is fixedly coupled to the vehicle back wall 36 is shown. In the depicted aspect of FIG. 11, the second panel 142 within the cargo area 20 together with the seatback 6 in the substantially vertical position 5, ceiling 10, and tray 12 define the storage enclosure 2.

Figure 12:
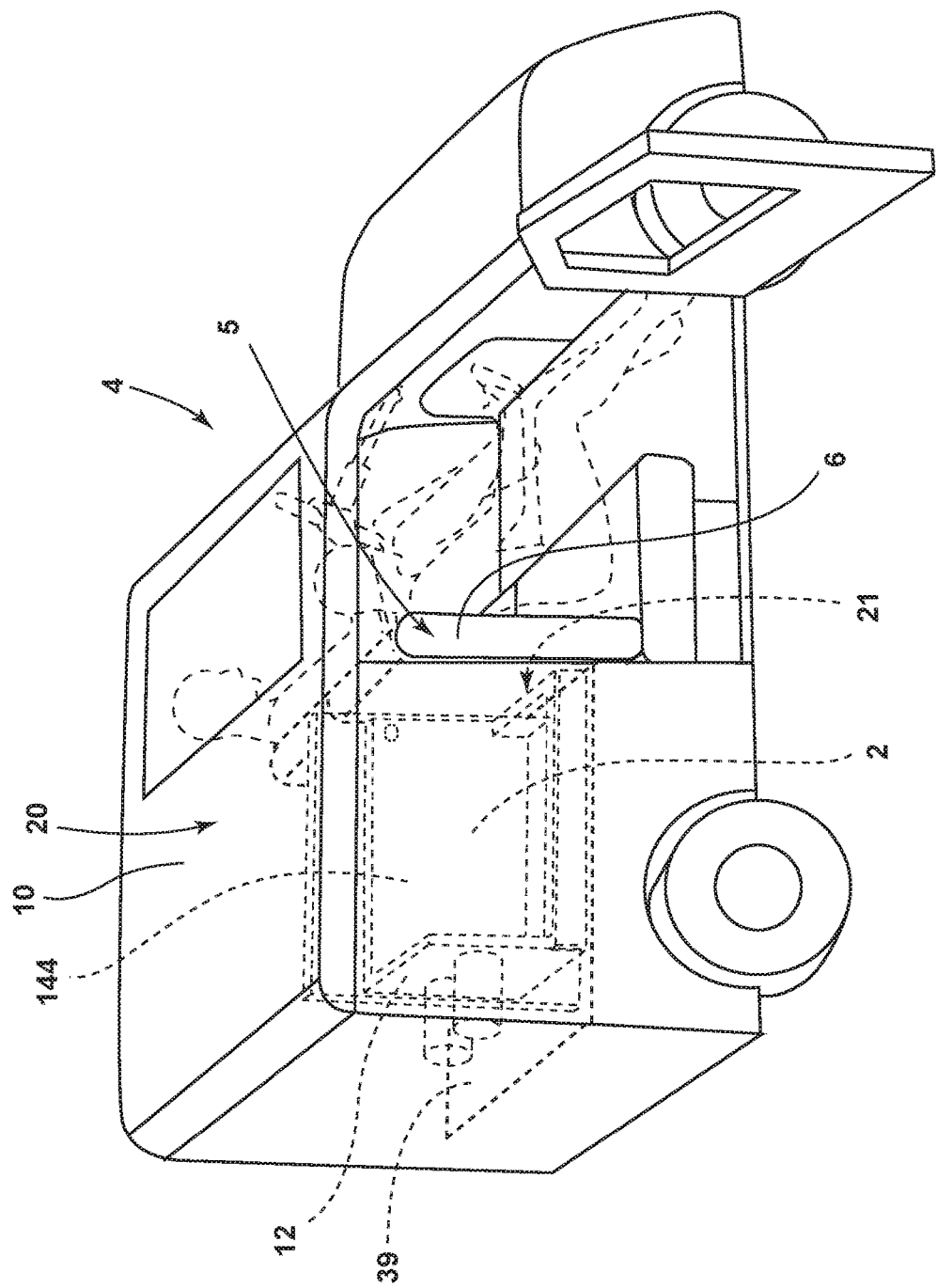
FIG. 12 is a perspective view of a vehicle with the storage enclosure partially defined by an outboard member that is a panel coupled to the floor of a vehicle cargo area of another aspect of the present disclosure.

With reference to FIG. 12, an aspect of the disclosure with the third panel 144 fixedly coupled to the cargo area floor 39 of the cargo area 20 is shown. In the depicted aspect of FIG. 12, third panel 144 within the cargo area 20 together with seatback 6 in the substantially vertical position 5, ceiling 10, and tray 12 define storage enclosure 2.

Figure 13:
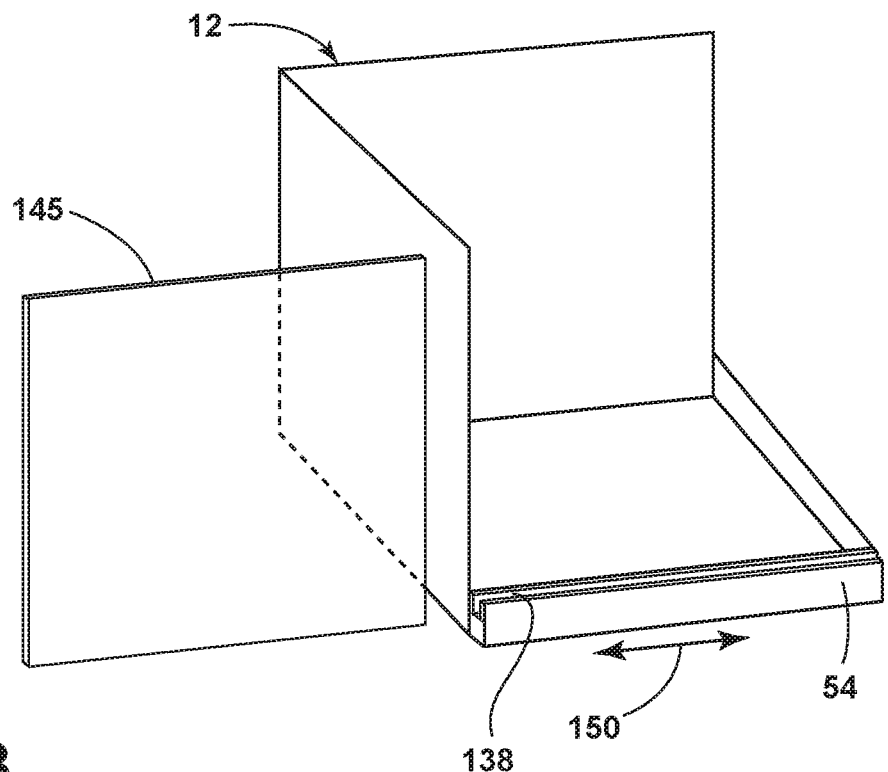
FIG. 13 is a simplified perspective view of the tray and a panel in an uncoupled position of an aspect of the present disclosure.
Figure 14:
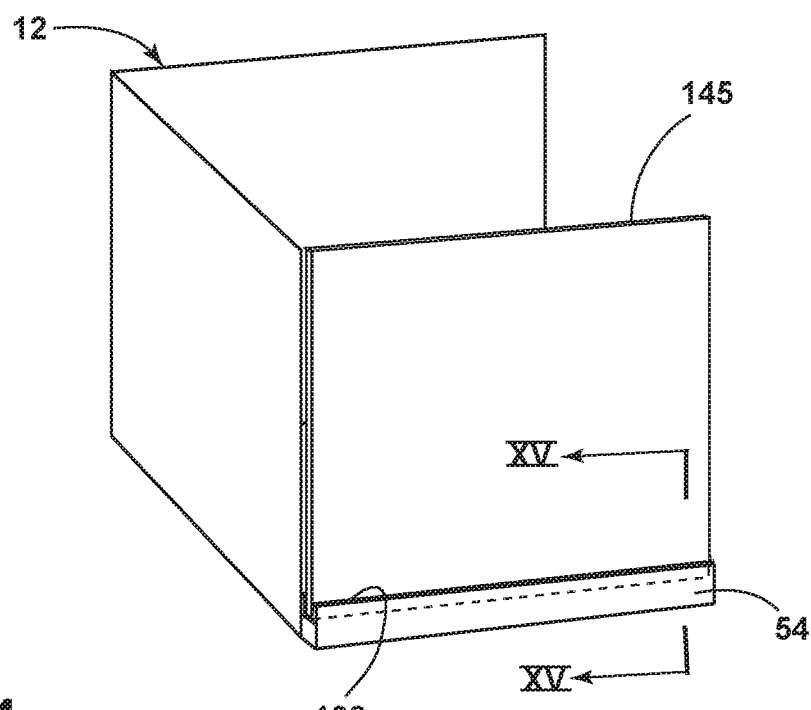
FIG. 14 is a simplified perspective view of the tray and panel of FIG. 13 in a coupled position of an aspect of the present disclosure.

Referring to FIG. 13, the tray 12 is coupled with outboard member 145, which represents simplified versions of first panel 140, second panel 142, third panel 144, or various other outboard member designs and/or configurations. For clarity, certain elements such as the ceiling 10, vehicle back wall 36, cargo area floor 39, and seatback 6 have been omitted from FIGS. 13 and 14. FIG. 13 depicts the tray 12 and outboard member 145 in an uncoupled configuration. The arrow shown at 150 shows the direction of the tray's 12 movement from loading area 32 to a cargo area 20. In the depicted aspect, the outboard member 145 is stationary in the cargo area 20. FIG. 14 depicts the tray 12 and outboard member 145 in a coupled configuration.

Figure 15:
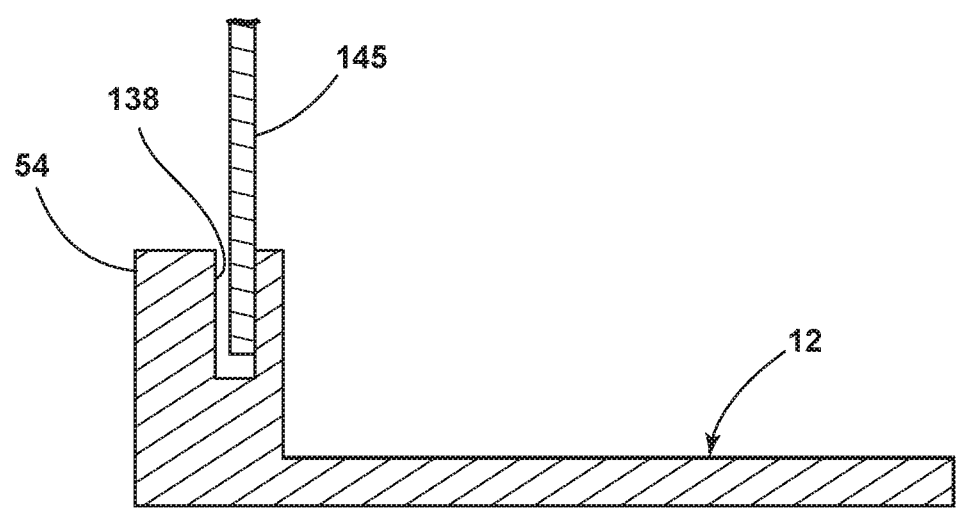
FIG. 15 is a sectional view taken along line XV-XV of FIG. 14 of the tray and panel in a coupled position.

As shown in FIG. 15, as the tray 12 slides rearward into the cargo area 20, the outboard member 145 engages with the groove 138 in the second lip 54 of the tray 12.

In various aspects, the outboard member may include any member that defines a storage enclosure at least partially defined by the tray. In various aspects, the outboard member may be a vehicle body component, a separate member fixed to the vehicle, an adjacent tray, or any other structure that at least partially defines the storage enclosure.

In various aspects of the disclosure, a row of seats may include two seating assemblies 22 that each cover approximately 50% of the row of seats. In various aspects, the row of seats may include two seating assemblies 22 that cover approximately 40% of the row of seats and one seating assembly that covers approximately 20% of the row of seats. In various aspects, the row of seats may include seats divided according to other proportions.

In various aspects, the vehicle 4 may be an autonomous vehicle or another type of vehicle. In various aspects, the storage enclosure 2 and variations thereof may be used for mass transit, fleet, and other larger occupant vehicles. In various aspects, the storage enclosure 2 and variations thereof may be used for taxi-type vehicles at airports or other congested travel areas (train stations, ferry docks, etc.).

It is contemplated that the disclosure includes various aspects in which one or more rear facing seats are present in the vehicle. The seatback of the rear facing seat may be pivotable towards the rear of the vehicle, which may include the cargo area. The cargo could is transferred between the substantially horizontal seatback of the rear-facing seat to the cargo area.

It is also contemplated that the disclosure includes various aspects including vehicle configurations in which the cargo area might be in the front of the vehicle. The luggage may be loaded into the passenger area and onto a substantially horizontal seatback and transferred to the cargo area in the front of the vehicle.

It is contemplated that to minimize noise and possible cargo damage, a clamping device is selectively applicable downwards from the ceiling of the secure cargo area on to the top and sides of the contents of the tray. In various aspects, the clamping device will be released when the seatback is lowered to the horizontal loading position.

In various aspects, it is contemplated that all sliding box corners shall be filleted for ease of cleaning and visibility. Also, it is contemplated that the tray shall be fully illuminated when the seatback is open to assist visibility. It is also contemplated that the sliding tray interfaces with the cargo area in such a way that there are no places for items or parts of items such as strap ends to enter, jam or be mislaid.

It is contemplated that in various aspects the cargo area may be segmented into two or more separate and secure storage areas.

In various aspects, the tray fits closely in the cargo area. The top of the tray is almost in contact with the cargo area ceiling. The outboard lip of the tray is almost in contact with the inside of the cargo area.

A variety of advantages may be derived from the use of the present disclosure. Vehicle occupants benefit from cargo containment in the event of an accident. Cargo is restrained in the storage enclosure and does not have to be restrained with nets or tie downs. The passenger does not encounter visual or physical obstacles to restraining cargo. The disclosure provides for easy stowage of personal items. The location of the tray within the vehicle promotes posture based safe lifting and handling of luggage. Stowage of luggage is substantially effort free cargo loading and unloading may be done without bending or reaching. There is security of property during transportation because thieves cannot see the property. The cargo handling system encourages a high level of management of personal space and security. The cargo handling system provides storage capacity for large or heavy items. There is freedom from loss or damage to cargo in the autonomous vehicle. The storage enclosure encourages automatic suppression of luggage NVH (noise vibration harshness) and abrasion damage.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A storage enclosure for a vehicle comprising:
a seatback including a back;
an outboard member;
a ceiling;
a tray wherein the tray comprises a base with at least one wall extending upward from the base; and
a cargo area floor, wherein the cargo area floor and the back of the seatback in a substantially horizontal position define a cargo loading surface;
wherein the tray is selectively operable to transfer cargo along the cargo loading surface and in a longitudinal direction between a passenger area and a cargo area and in a latitudinal direction in the cargo area;
wherein the tray is selectively operable to define the storage enclosure in the cargo area that is at least partially defined by the seatback in a substantially vertical position, the outboard member, and the ceiling; and
wherein one or more rails are coupled to the cargo loading surface and wherein the tray is coupled to the one or more rails and slides along the one or more rails.

2. The storage enclosure for a vehicle of claim 1 wherein the outboard member is a vehicle wall.

3. The storage enclosure for a vehicle of claim 1 wherein the outboard member is a panel coupled to the vehicle.

4. The storage enclosure for a vehicle of claim 3 wherein the panel is coupled to a cargo area floor, the ceiling, or a back wall of the vehicle.

5. The storage enclosure for a vehicle of claim 1 wherein the at least one wall of the tray includes a sidewall and a back wall.

6. The storage enclosure for a vehicle of claim 1 wherein the ceiling defines a multilayer construction.

7. The storage enclosure for a vehicle of claim 1, further comprising:
one or more rollers disposed between the tray and the cargo loading surface.

8. The storage enclosure for a vehicle of claim 7, wherein the one or more rollers are coupled to a bottom portion of the tray.

9. The storage enclosure for a vehicle of claim 8, wherein the one or more rollers are configured to engage the rails to move the tray along the rails.

10. The storage enclosure for a vehicle of claim 1, further comprising:
dampers disposed between a vehicle wall and the tray.

11. A tray comprising:
a bottom portion; and
first and second walls;
wherein the bottom portion is positionable in a cargo area to form a storage enclosure defined by the first and second walls, the bottom portion, a seatback in a substantially vertical position, an outboard member, and a ceiling;
wherein when the bottom portion is positionable in the cargo area to form a storage enclosure, a damper extending between the second wall of the tray and a vehicle back wall is compressed, and
wherein the bottom portion is selectively longitudinally positionable within a vehicle between a loading area and the cargo area when the seatback is positioned in a substantially horizontal position.

12. The tray of claim 11 wherein the damper includes a preloaded member.

13. The tray of claim 12 wherein when the bottom portion is positioned in the cargo area to form the storage enclosure, then the damper pushes the bottom portion forward and onto the seatback when the seatback is moved from the substantially vertical position to the substantially horizontal position.

14. The tray of claim 11 wherein the outboard member is a panel and wherein the panel and the bottom portion are selectively coupled when the panel is within a groove defined in the bottom portion.

15. A cargo handling system for a vehicle comprising:
a passenger area including a primary loading area proximate a front door and a secondary loading area proximate a rear door;
a cargo area; and
at least one tray having a bottom portion and at least one lip extending upward from the bottom portion wherein the at least one tray is selectively movable on a cargo loading surface defined by the primary loading area, the secondary loading area, and the cargo area, wherein a seatback in a substantially horizontal position defines the secondary loading area, wherein the bottom portion includes first and second walls extending from the bottom portion to an area proximate the ceiling, wherein the bottom portion, the first and second walls, an outboard member, the ceiling, and the seatback in a substantially vertical position define a storage enclosure when the bottom portion is disposed in the cargo area, and wherein a damper extends from the second wall to a vehicle back wall when the at least one tray is disposed in the cargo area to form the storage enclosure.

16. The cargo handling system of claim 15, wherein the at least one tray is configured to slide along the cargo loading surface in a longitudinal direction and a latitudinal direction.

17. The cargo handling system of claim 16, further comprising rollers disposed between the at least one tray and the cargo loading surface.

18. The cargo handling system of claim 15, wherein the lip includes a plurality of lips disposed around a perimeter of the at least one tray.

* * * * *